H. L. BALDERSTON.
CONTINUOUS INDICATING AND RECORDING MICROMETER.
APPLICATION FILED FEB. 7, 1913.

1,208,725.

Patented Dec. 19, 1916.
2 SHEETS—SHEET 1.

Witnesses:-
Carrie E. Kleinfelder
Rose Garfinkel

Henry L. Balderston INVENTOR.
By Cyrus N. Anderson
ATTORNEY.

H. L. BALDERSTON.
CONTINUOUS INDICATING AND RECORDING MICROMETER.
APPLICATION FILED FEB. 7, 1913.
1,208,725.
Patented Dec. 19, 1916.
2 SHEETS—SHEET 2.
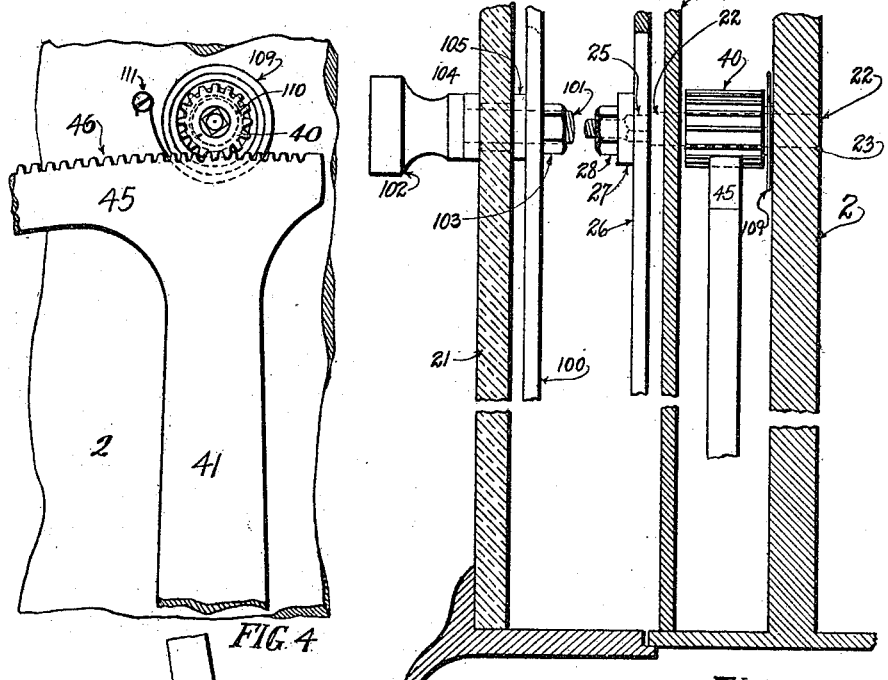
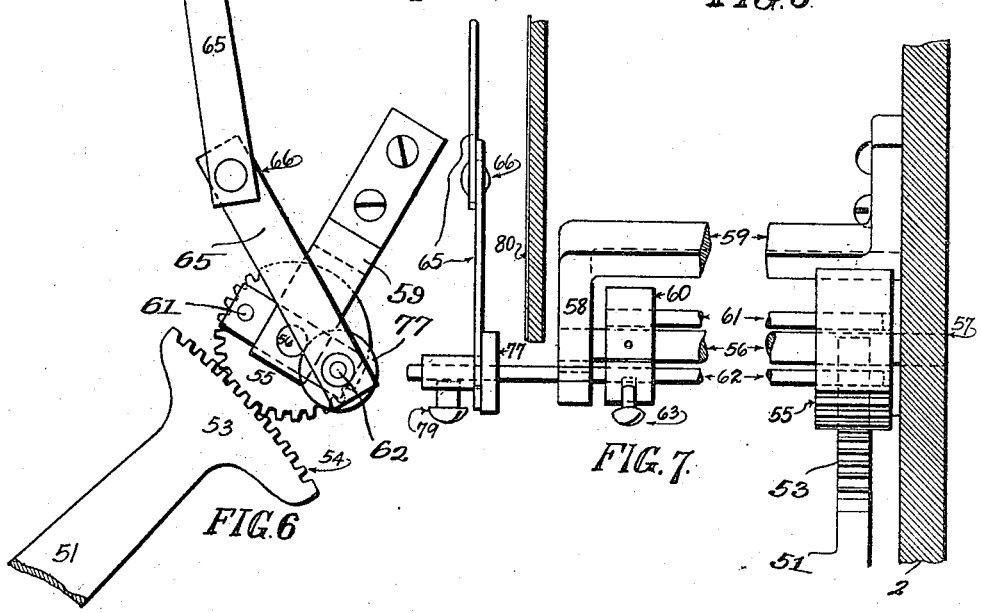

UNITED STATES PATENT OFFICE.

HENRY L. BALDERSTON, OF LLANERCH, PENNSYLVANIA.

CONTINUOUS INDICATING AND RECORDING MICROMETER.

1,208,725.  Specification of Letters Patent.  Patented Dec. 19, 1916.

Application filed February 7, 1913. Serial No. 746,782.

*To all whom it may concern:*

Be it known that I, HENRY L. BALDERSTON, a citizen of the United States, and a resident of Llanerch, in the county of Delaware and State of Pennsylvania, have invented certain new and useful Improvements in Continuous Indicating and Recording Micrometers, of which the following is a specification.

My invention relates to a continuous indicating and recording micrometer and it has for its object to provide a device which is adapted for use in connection with the manufacture of linoleum, paper and similar articles for the purpose of indicating continuously the thickness of the sheets.

Unless it be desired to produce a record of the thickness of the sheet being manufactured, the recording mechanism may be dispensed with and the indicating mechanism used alone. Many manufacturers prefer, however, to keep a record of the thickness of the sheet manufactured, hence I have illustrated my invention as it is embodied in both a recording and an indicating device.

In use it is desirable to employ two or more devices embodying my invention, placing them at intervals transversely with respect to a sheet as it is manufactured and noting the indications thereof to ascertain the thickness of such sheet. The operative is thus enabled to ascertain at any moment the thickness of such sheet. If it should be found that the thickness is greater than necessary, it may be decreased and a great saving in material thereby effected with resulting economy.

Other objects and advantages of my invention will be referred to in the specification or will be apparent therefrom.

In the accompanying drawings, to which reference should be had for a clear understanding of my invention, I have illustrated a preferred form of embodiment of my invention, though it will be understood that many changes in the details of construction may be made within the scope of the claims without departing from the principle of my invention.

Figure 1:
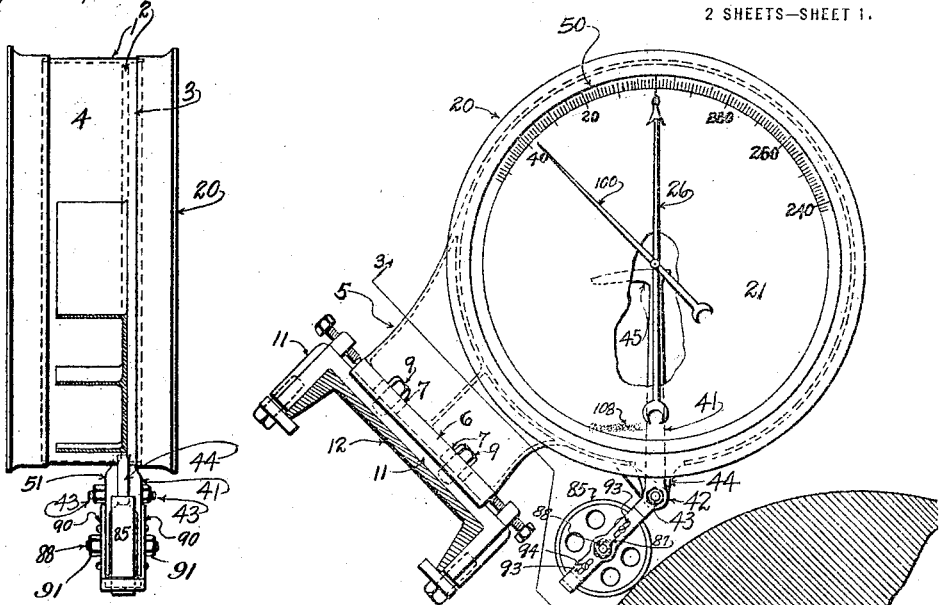
Figure 3:
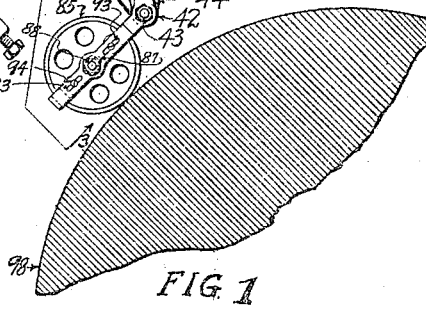
Figure 2:
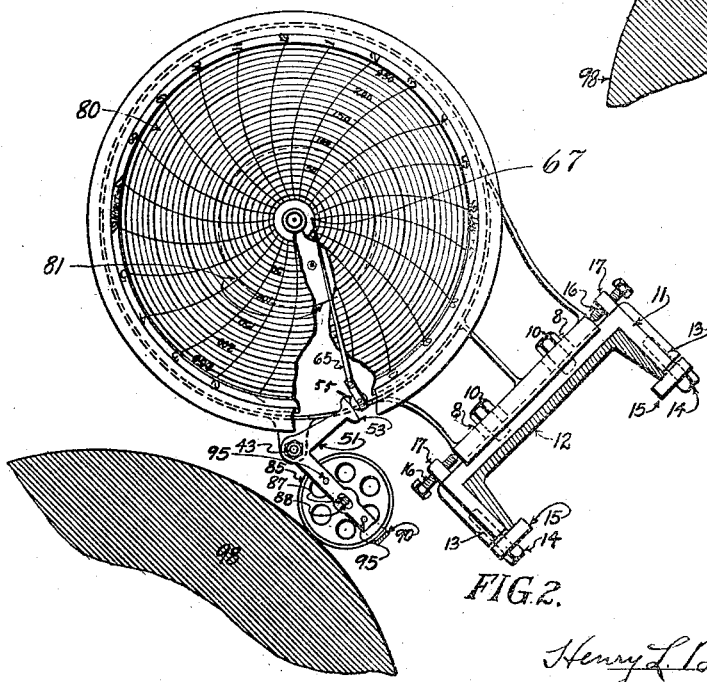

In the drawings: Figure 1 is a front elevation of a device embodying my invention and showing also a portion of the end of a roll against which one part of the device contacts; Fig. 2 is a rear elevation of the said device also showing a portion of the roll against which a part of the said device is in contact; Fig. 3 is a section on the line 3—3 of Fig. 1; Fig. 4 is an enlarged view showing a detail of construction; Fig. 5 is an enlarged sectional view looking toward the left in Figs. 1 and 4, showing additional details of construction but omitting the recording mechanism; Fig. 6 is an enlarged view in side elevation, showing additional details of construction; and Fig. 7 is an enlarged sectional view looking toward the left in Figs. 2 and 6, showing additional details of construction.

Referring to the drawings,—1 designates a casing cylindrical in form and divided by means of a cross plate or web 2 into what may be termed receptacles or chambers 3 and 4 upon opposite sides of the said plate or web. The receptacle 3 is quite shallow as compared with the receptacle 4 for a purpose which will be hereinafter stated. The casing is supported upon a pedestal 5 which, as illustrated, is integral with the said casing, although it may be constructed separately and otherwise secured to the said casing. The base 6 of the said pedestal is provided with slots 7 and 8 at its opposite ends for the reception of screw-threaded bolts 9 and 10 which engage screw-threaded openings in an adjustable yoke-shaped member 11 which fits over and is secured to a channel iron 12. In order to adjustably secure the yoke-shaped member 11 to the channel 12 the ends of such yoke-shaped member are provided with screw-threaded openings 13, shown in Fig. 2, for the reception of screw-threaded bolts 14 upon which clamping members 15 are located. In order to move the supporting yoke-shaped member 11 from one position to another upon the channel 12 the screw-threaded bolts 14 may be loosened. After the said member 11 has been moved to whatever position may have been desired, it is retained in such position by screwing up the bolts 14 to clamp the clamping members 15 against the edges of the channel iron 12.

In order to adjust the base 6, its pedestal 5 and the casing 1 supported thereon transversely of the channel iron 12, I have provided adjusting bolts 16 which have screw-threaded engagement with lugs or ears 17 upon the opposite ends of the base portion of the yoke-shaped member 11. The method of adjustment by the use of these adjustable screw bolts is apparent.

The receptacle 3 is adapted to be closed by means of a cover 20, the face 21 of which consists of glass or other transparent material in order that indicating pointers situated under the face may be visible to the operative.

22, shown in Fig. 5, designates a rotatable shaft supported at one end in an opening 23 formed in the plate or web 2. The opposite end of the said shaft extends through and is supported upon a plate 24, as is clearly indicated in Fig. 5, of the drawings. The outer end portion of the said shaft is provided with a polygonal portion or section 25 upon which is mounted an indicator or pointer 26. The pointer 26 is held in position by means of a washer 27 and nut 28. A gear 40 is secured upon the shaft 22 intermediate the plates 2 and 24, as shown.

41 designates a lever pivoted intermediate its ends at 42 upon a pivot 43 supported in a lug 44 depending from the casing 1. The portions of the said lever 41 upon opposite sides of its pivot are angularly related to each other as shown in Fig. 1 of the drawings. The upper end of the said lever is provided with an arcuate shaped portion or segment 45 having gear teeth 46 which engage the gear 40. The pitch line of the gear 46 is concentric with the pivot of the lever 41. It will be understood that when the upper end of the lever 41 moves to the right in Figs. 1 and 4 the gear 40 is caused to rotate toward the left, that is, in a direction contrary to that in which the hands of a watch move, causing the indicator 26 to move in a corresponding direction. Upon the face plate 24, Fig. 5, I provide graduation marks 50 numbered from 0 to 300 more or less. The position of the point of the indicator 26 with respect to these marks indicates in $\frac{1}{1000}$ths of an inch substantially the thickness of the sheet which is being manufactured, as will hereinafter be described; or, when it is desired to have the device indicate $\frac{1}{100}$ths of a millimeter, the graduations are made to read from 0 to 700.

As already pointed out, I may associate with the indicator as thus described a recording device or mechanism. In the construction as illustrated, such recording mechanism is situated upon the opposite side of the intermediate plate 2 from the indicating mechanism which has been partially described. The recording mechanism comprises an angular lever 51, Fig. 2 also pivoted intermediate its ends upon the pivot 43 at the opposite side of the lug 44 from the lever 41. The upper end of the said lever is provided with an arcuate shaped section or segment 53 provided with gear teeth 54, Fig. 6 the pitch line of which is concentric with the axis of the pivot 43. The gear teeth 54 are in engagement with a gear 55 secured upon a shaft 56 one end of which is supported in an opening 57, Fig. 7 in the plate 2 and the other end of which is supported in the outer depending end 58 of a bracket 59 secured to and extending laterally from the said plate 2.

60 designates a member supported upon the shaft 56 and situated a distance from the gear 55.

61 designates a rod or bar extending transversely through the gear 55 and through the member 60.

62 also designates a rod or bar located upon the opposite side of the shaft 56 from the rod or bar 61 and extending through the gear 55 and through the member 60. The purpose of the rod or bar 61 is to add rigidity to the structure and prevent twisting or displacement of the rod 62. The said rod or bar 62 is adjustably secured in the member 60 by means of a binding screw 63. The outer end of the said rod or bar 62 extends a considerable distance beyond the member 60 and supports a recording finger 65, consisting of two sections or members which are adjustably connected at 66, and carrying upon its free end a pen or stylus 67. The lower end of the said recording finger is provided with an opening through which the outer end of the said rod or bar 62 extends, and the said finger is held in position upon the said bar by being driven against a collar 77 and held in position by means of a binding screw 79. The outer end of the recording finger coöperates with a recording sheet 80 supported upon a clock mechanism 81 shown in outline in Fig. 2 of the drawings. The recording sheet is driven by the clock mechanism in a direction contrary to that of the direction of movement of the hands of a watch. The said sheet is provided with circles concentric with its axis of rotation which circles may be numbered from 0 to 250. It will be understood that when the gear segment 53 at the upper end of the lever 51 is moved toward the left the recording finger will be rotated toward the right, its axis of rotation being coincident with the axis of the gear 55 and the shaft 56.

The levers 41 and 51 are located upon opposite sides of the lug 44, as is shown in Fig. 3 of the drawings, and are supported upon the common pivot 43. A space is provided between the lower ends of the said levers in which a wheel 85 or equivalent device is located which wheel is supported upon the lower ends of the said levers 41 and 51. The lower portion of each lever is provided with a slot 87 through which the opposite ends of the wheel shaft 88 extend. The outer ends of the said wheel shaft extend through openings through the legs of a yoke member 90. Nuts 91 may be placed upon the opposite ends of the wheel shaft 88 as shown in Fig. 3. Slots 93 are provided in the opposite sides of the yoke 90 for the reception of fastening screws 94 which extend through the said slots and engage screw-threaded holes 95 in the lower portions of the levers 41 and 51. By loosening the fastening screws 94 it will be understood that the yoke 90 and consequently the wheel 85 may be adjusted lengthwise of the lower end portions of the said levers 41 and 51. The purpose of such adjustment will be fully described hereinafter. The wheel 85 is adapted to rest upon a roller 98 which serves as a guide and support for a sheet the thickness of which is being measured.

100 designates a pointer which is secured to the glass face plate 21 by means of a screw-threaded bolt 101. The outer end of the said bolt is provided with a milled head 102 by means of which the said bolt 101 may be turned to position the indicating pointer 100 at such point with respect to the graduation lines 50 as may be desired. It will be understood that the nut 103 is screwed down with sufficient tightness to clamp the washer 104 and bushing 105 to the glass plate 21 with sufficient tightness against the latter to hold the bolt 101 and the pointer 100 thereon in any position to which the same may be adjusted. The purpose of the pointer 100 will be hereinafter more fully described.

108, Fig. 1 designates a coiled spring which is connected at one end to the upper end portion of the lever 41 and at its opposite end to the cross plate 2 or any other fixed support. The said spring tends to draw the upper end portion of the lever 41 toward the left (having reference to Fig. 1 of the drawings) and to hold the wheel 85 against the guide roll 98 or a sheet of material interposed between the said wheel and roll. In view of the fact that the levers 41 and 51 are connected together it will be understood that the upper end portion of the latter lever is also drawn toward the left. When the wheel 85 is lifted as by the insertion of a sheet of material between the said wheel and the guide roll 98, pivotal movement of the levers 41 and 51 is caused with consequent rotation of the gears 40 and 55. The pointers 26 and 65 being connected respectively to these gears it is apparent that rotation of the latter causes corresponding rotation of the said pointers.

In order to prevent lost motion between the gear 40 and the gear segment 45 I have provided a coiled spring 109, shown in Figs. 4 and 5, the inner end of which is connected to a collar 110 secured to the shaft 22. The outer end of the said spring is secured to the intermediate plate 2 by means of a screw 111 as shown in Fig. 4 of the drawings. The spring 109 may and preferably should be relatively weak. In the construction as shown this spring is slightly under tension and has a tendency to unwind in consequence of which the teeth of the gear wheel are held in contact with the teeth 46 of the gear segment 45.

The ratio of the portions of the levers 41 and 51 upon opposite sides of the pivot 43, the gear segments to the gears, and the length of the pointers, may be such as to cause the ends of the pointers to move through distances as many times greater than the distance through which the wheel 85 is moved by the presence of a sheet upon the guide roll 98 or otherwise as may be desired. It will be understood that the construction may be varied to vary the ratio of the distances of movement between the wheel 85, or rather the axis of the said wheel, and the ends of the pointers 26 and 65 as may be desired.

In the use of my device it is necessary that the wheel 85 and that the position of the said device upon the member 11 be so adjusted that when the said wheel is in contact with the guide roll 98, as shown in Figs. 1 and 2, the pointers 26 and 65 will occupy zero positions.

The channel iron 12 is so situated with respect to the guide roll 98 or other equivalent material supporting means that one or more devices embodying my invention may be supported thereon in operative relation to the said roll.

My invention obviously is not dependent upon the number of devices which are employed in connection with a single sheet or web but as I have already indicated it is preferable to employ at least two, one of which indicates the thickness of the sheet or web at one edge while the other indicates the thickness at the opposite edge. Should it be desired a third device may be employed intermediate these two to indicate the thickness of the sheet or web at its center. In order that the operator may know the thickness of the web desired and in order that he may readily ascertain whether or not he is securing a web of such thickness I have provided a pointer 100 which is normally stationary but which may be placed previous to the beginning of the operation at a position indicating the thickness desired. It will be the duty of the operative to see that the pointer 26 is maintained at a position approximating as nearly as possible the position of the fixed pointer 100. Should he find, for instance, that the pointer 26 is indicating a greater thickness than that desired it will be necessary for him to adjust the mechanism employed in the manufacture of the sheet so as to produce a sheet of less thickness. In the construction as illustrated the relation of the parts with respect to each other is such that if a sheet one-thousandth ($\frac{1}{1000}$) of an inch in thickness be placed between the guide roll 98 or other support and the wheel 85 the end of the pointer 26 will move through a distance equal to the distance between any two adjacent graduation marks upon the edges of the plate 24 for instance, the zero mark and the next adjacent graduation mark. The end of the pointer 65 will simultaneously move outwardly over the recording sheet 80.

Referring to Fig. 2 of the drawings it will be observed that the recording sheet is divided into two sections corresponding to day and night. Day section begins at six o'clock a. m. and terminates at six p. m. of the same day. To indicate that this is the case I have placed the word "Day" at the beginning of the day section at the right hand side of Fig. 2 and the word "Night" at the beginning of the night section at the left hand side of said figure.

I claim:

1. In a device of the character described, the combination of a casing, indicating and recording mechanisms situated in said casing, arms having operative connection respectively with said indicating and recording mechanisms, means for pivotally supporting the said arms, a contact member, and means for supporting said contact member, said supporting means having connection with said arms.

2. In a device of the character described, the combination of indicating and recording mechanisms, arms having operative connection respectively with said indicating and recording mechanisms, means for pivotally supporting said arms, projections extending from said arms beyond the said pivotal supporting means, and a contact member supported on said projections, substantially as described.

3. In a device of the character described, the combination of indicating and recording mechanisms, arms having operative connection respectively with said indicating and recording mechanisms, means for pivotally supporting said arms, the pivotal axes of said arms being in alinement, extensions extending from said arms beyond such pivotal supporting means such extensions being arranged side by side, and a contact member supported upon said extensions, substantially as described.

4. In a device of the character described, the combination of a casing, indicating and recording mechanisms situated in said casing, levers pivotally supported intermediate their ends, the inner end of one lever having operative connection with the indicating mechanism and the inner end of the other lever having operative connection with the recording mechanism, a contact wheel, and means for adjustably connecting the said wheel with the outer end portions of said levers.

5. In a device of the character described, the combination of a casing, indicating and recording mechanism situated in said casing, arms extending inwardly of said casing and having operative connection respectively with the said indicating and recording mechanisms, means for pivotally supporting the said arms, an extension having rigid connection with the said arms and extending outwardly with respect to the said casing, a contact wheel, and means for adjustably connecting the same with and supporting it upon the said outward extension, substantially as described.

6. In a device of the character stated, a support, a yoke mounted on said support and adjustable longitudinally with respect thereto, a casing adjustably mounted on said yoke for transverse movement with respect to said support, a dial visibly supported at one side of said casing and having indicating data thereon, a shaft rotatably mounted in said casing and centrally disposed with respect to said dial, a pointer secured for movement with said shaft and juxtaposed with respect to said dial, a bell crank pivoted to said casing, a segmental gear on one end of said bell crank, a pinion fixed to said shaft and normally in mesh with said gear, and a contact roller carried by the opposite end of said bell crank and adapted to contact with a sheet of material, the thickness of which is to be determined, said parts being so arranged that a variation in the thickness of said material causes said pointer to be moved in a predetermined manner.

7. In a device of the character stated, a casing, a dial visibly supported at one side thereof and having indicating data thereon, a shaft rotatably mounted in said casing and centrally disposed with respect to said dial, a pointer secured for movement with said shaft and juxtaposed with respect to said dial, a bell crank pivoted to said casing, a segmental gear on one end of said bell crank, a pinion fixed to said shaft and meshing with said segmental gear, a contact roller journaled in the opposite end of said bell crank and adapted to contact with a sheet of material, and means suitably mounted adjacent said dial for determining the range of movement of said pointer, caused by variations in the thickness of the said material.

8. In a device of the character stated, a casing, a dial visibly supported at one side thereof and having indicating data thereon, a second dial visibly supported thereon for recording purposes, a shaft rotatably mounted in said casing and centrally disposed with respect to said dials, a pointer secured for movement with said shaft and juxtaposed with respect to said indicating dial, a recording stylus suitably pivoted adjacent said recording dial and operatively disposed with respect thereto, a pair of bell cranks pivoted to said casing, a contact roller journaled between said cranks and adapted to contact with a sheet of material, a segmental gear on one end of each of said bell cranks, a pinion fixed to said shaft and meshing with one of said segmental gears, a second pinion operatively connected to said recording stylus and meshing with the other of said segmental gears, whereby movement of said bell cranks, caused by a variation in the thickness of said material, actuates said indicating pointer and said recording stylus respectively in a predetermined manner.

In testimony that I claim the foregoing as my invention, I have hereunto signed my name this 29th day of January, A. D. 1913.

HENRY L. BALDERSTON.

In the presence of—
CARRIE E. KLEINFELDER,
J. STUART FREEMAN.

Copies of this patent may be obtained for five cents each, by addressing the "Commissioner of Patents, Washington, D. C."